UNITED STATES PATENT OFFICE.

ALFRED GEORGE WASS, OF LONDON, ENGLAND.

MANUFACTURE OF PRINTERS' VARNISH AND INK.

SPECIFICATION forming part of Letters Patent No. 716,318, dated December 16, 1902.

Application filed October 15, 1901. Serial No. 78,676. (No specimens.)

*To all whom it may concern:*

Be it known that I, ALFRED GEORGE WASS, a subject of the King of Great Britain and Ireland, and a resident of London, England, have invented a certain new and useful Improvement in the Manufacture of Printers' Varnish and Ink, (for which I have filed an application for British Patent No. 6,061, dated March 22, 1901;) and I do hereby declare the following to be a full, clear, and exact description of the same.

This invention relates to the manufacture of printers' varnish and ink, its object being to cheapen the production without prejudice to the required properties of the product.

To this end the invention is characterized by the employment as the basis of the varnish or ink of mineral oil of from .880 to .905 specific gravity, a heavy distillate of the lubricating-oil series, to which the required viscosity is imparted by rosin in sufficient quantity, dissolved in the oil when sufficiently heated to melt the rosin. Equal quantities, by weight, of the mineral oil and rosin produce a good printers' varnish or a good printers' ink when also associated with lampblack or a suitable pigment or coloring-matter, which may be incorporated and thoroughly mixed with the hot varnish in any suitable manner, the resultant pulp being ground, if required.

The proportions of the respective ingredients which I prefer to use are about eighteen parts of mineral oil of about .880 specific gravity, about twenty parts of rosin, and if a black printing-ink is required, about five to six parts of lampblack. Heavy mineral lubricating-oil of between such specific gravities is of advantage as the basis of such varnish or ink over burnt and boiled linseed-oil or crude petroleum or refined petroleum of the illuminating-oil series in that its specific gravity more nearly approaching that of the body-giving rosin with which it is associated enables the economic obtainment of a reliable varnish or ink not liable to layer or separate on account of a wide difference between the specific gravities of its constituents and in that it needs a much less proportion of rosin to produce a suitable viscosity and avoids the necessity of using soap, gum-dammar, or other such ingredients, and so cheapens the process of production and the product, and in that the varnish needs a very considerably-reduced proportion of lampblack or coloring-matter to that required by the hitherto-used bases to produce a good printers' ink of given quality, thus considerably lessening the cost, while the ink will work much freer on the block or type, and while it will not so freely dry or oxidize on the type will more freely do so on paper.

What I claim as my invention, and desire to secure by Letters Patent, is—

1. A composition for printers' varnish consisting of substantially equal parts of heavy mineral oil of from .880 to .905 specific gravity and of rosin dissolved therein.

2. A composition for printers' ink consisting of substantially equal parts of heavy mineral oil of from .880 to .905 specific gravity, rosin dissolved therein and black or coloring-matter.

3. A composition for printers' varnish consisting of eighteen parts heavy mineral oil of about .880 specific gravity and twenty parts rosin dissolved therein, substantially such as set forth.

4. A composition for printers' ink consisting of eighteen parts heavy mineral oil of about .880 specific gravity, twenty parts rosin dissolved therein and five or six parts black or coloring-matter, substantially such as set forth.

In testimony whereof I have signed this specification in the presence of two subscribing witnesses.

ALFRED GEORGE WASS.

Witnesses:
CHARLES AUBREY DAY,
ALFRED CHARLES DAY.